June 17, 1924.
J. HOPKINSON
1,497,753
BUTTER SCALE
Filed Feb. 14, 1920
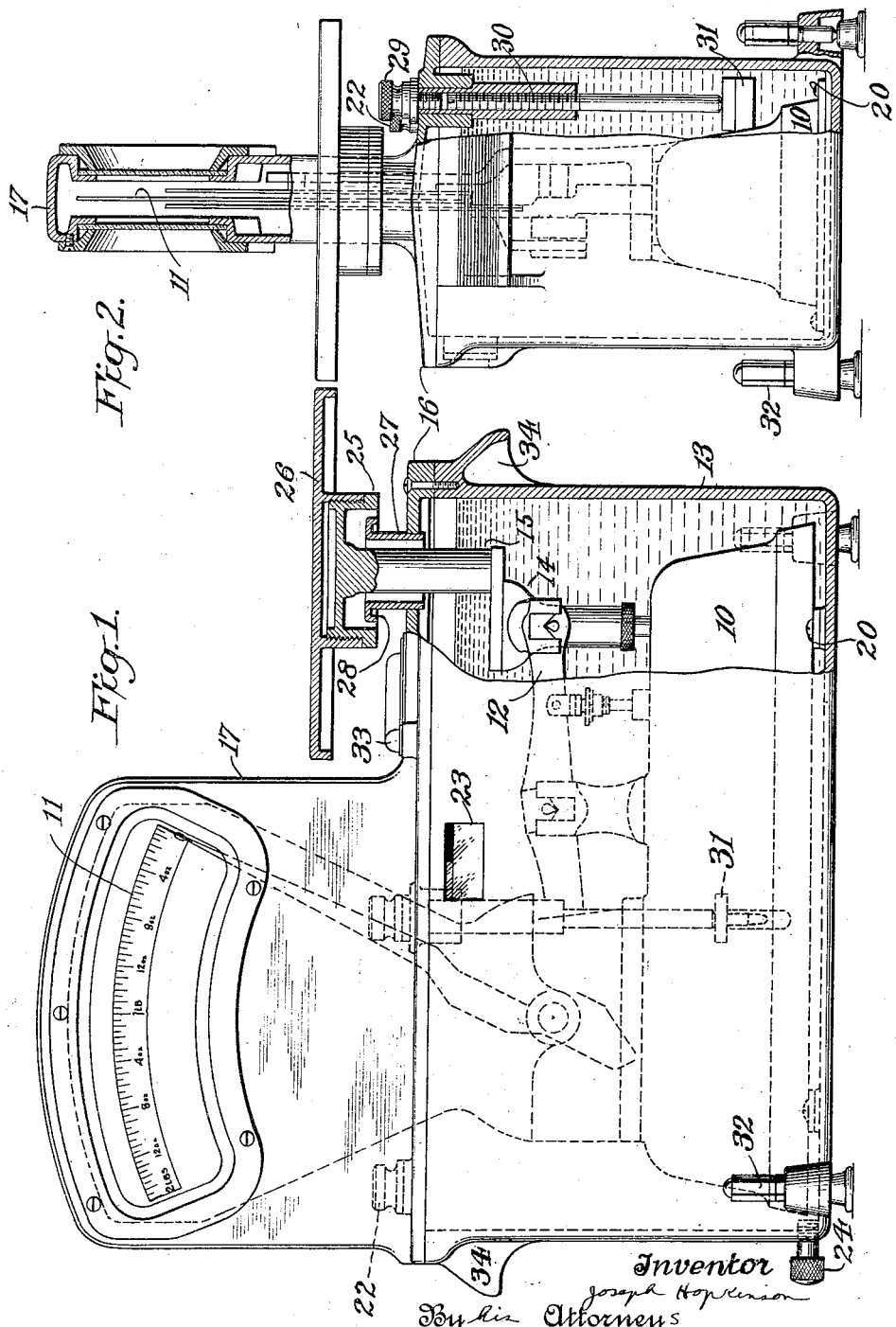
Inventor
Joseph Hopkinson
By his Attorneys
Kerr Page Cooper & Hayward Patented June 17, 1924.

1,497,753

UNITED STATES PATENT OFFICE.

JOSEPH HOPKINSON, OF DAYTON, OHIO, ASSIGNOR, BY MESNE ASSIGNMENTS, TO DAYTON SCALE COMPANY, OF DAYTON, OHIO, A CORPORATION OF NEW JERSEY.

BUTTER SCALE.

Application filed February 14, 1920. Serial No. 358,761.

*To all whom it may concern:*

Be it known that I, JOSEPH HOPKINSON, being a citizen of the United States, residing at Dayton, in the county of Montgomery and State of Ohio, have invented certain new and useful Improvements in Butter Scales, of which the following is a full, clear, and exact description.

In the use of weighing scales in dairies and markets, particularly in marketing of butter and other like products, there has been considerable objection to the use of certain types by sanitary inspectors due to the fact that butter and other greasy substances collected upon the scales and became rancid. This has resulted in orders being given to clean and wash the scales. The market employees in attempting to carry out these instructions frequently put the scales out of adjustment. In other cases the water used in the cleaning process collected upon the scale pivots thereby causing rusting with the result that the weighing devices became inaccurate. Water and other substances also collected upon certain parts to such an extent that the weight of the water or substance in itself affected the accuracy of the devices.

The present invention has for its objects the provision of a structure which will eliminate the objects previously set forth and permit unskilled employees to wash any parts upon which the butter might collect without the attendant difficulties heretofore mentioned.

To these and other ends my invention consists in the form and construction set forth in the accompanying drawings and specification and more particularly defined in the appended claims.

In the drawings:

Fig. 1 shows a side view of a scale having my improved construction embodied therewith. Certain of the parts are broken away to show the interior construction.

Fig. 2 shows an end view of the scale shown in Fig. 1, with certain parts shown in section and with the lever system details omitted for clearness.

In the preferred embodiment of my invention, I utilize a scale of a type well known in the art as a counter scale. Such a type of scale is shown in my prior Patent No. 1,012,640. Scales of this general class usually include a base structure shown at 10 which supports a chart 11 and a lever 12. The scale also includes other well known operating parts, such as a check, a weight indicator, dash pot, a counterbalancing means, zero setting device, etc. Inasmuch as the details of construction of these parts form no part of my present invention and are of the form well known in the art, they need not be further described. These parts, including the base, chart and weight indicator, I will hereafter term a scale assembly.

In its preferred form, I provide a tank or casing 13 which is preferably substantially rectangular in shape and of such size that the scale assembly will closely fit within the same, leaving the chart and weight-indicator projecting above the top thereof. Mounted upon the end of the lever 12 is a shot cup 14 which supports a weight moved part 15 usually termed a platform holder. The shot cup is provided with a plurality of apertures extending into the interior thereof. The purpose of these apertures will be hereafter explained. The top of the shot cup is substantially below the top of the casing, whereas the platform holder 15 extends considerably above the plane of the top of the casing or tank.

Fitting over the top of the casing is a cover 16 which is provided with an opening to permit the weight moved part to extend therethrough and also with an extension 17 which is preferably integral with the cover and which forms a chart housing encasing chart 11 and its cooperating weight indicator. The chart housing is provided with the usual glass covered window opening to permit the reading of the weight indication.

The scale assembly is secured in position within the tank by means of screws 20 which pass through openings in the base and take into the bottom of the tank or into a false bottom which is coextensive with the tank. The means for retaining the scale in place may be any one of a number which will prevent the shifting of the scale assembly and yet permit the ready withdrawal of the same from the tank for repairs or replacement.

The cover plate is provided with a suitable filling plug 22 and on the side of the tank I provide a liquid tight window 23 suitably marked to show the proper liquid level, should the tank be filled. A suitable drain plug 24 is also provided for draining the liquid from the tank.

The platform holder 15 at the top is provided with a laterally and downwardly depending flange 25 which is threaded to receive the platform 26. The threads are made close fitting or a suitable gasket is provided to prevent the ingress of liquid to the cavity between the parts. Concentric with the platform holder is a substantially cylindrical platform holder guard 27 which fits tightly in the opening in the cover and prevents the entrance of water or other substances into the tank or casing. The top of the platform holder guard is provided with a downwardly extending flange 28 which extends in close proximity to the flange 25 of the platform holder and thereby minimizes the possibility of water or other substances entering the tank or casing at this point.

The construction of the housing, which includes cover and tank, is such that it is substantially dust tight. The only opening thereinto is around the platform holder and this opening is restricted as much as possible and provided with the protecting flanges.

In order to provide a means for setting the scale to proper zero balance when the same is within the tank I provide a plug 29 which, when removed, permits a screwdriver to be applied to zero adjusting screw 30, thereby raising or lowering the zero adjusting lever 31. To level the scale I provide adjusting feet 32 and a two-way level 33. Suitable handles 34 are cast on the ends of the tank to permit the scale to be moved from place to place.

When the scale is to be put in use the tank 10 is preferably filled with sufficient liquid protecting substance preferably light cylinder oil to bring the level of the oil to the line on the glass window 23 inside of the tank. This level is such that all lever parts and the shot cup 14 are completely submerged and remain so irrespective of the load on the scale. The apertures in the shot cup admit oil to the cavity therein and prevent any change in the seal by reason of the quantity of oil in the cavity varying. This liquid protecting substance effectually prevents moisture or other foreign substances damaging the delicate scale parts and the protecting tank permits the washing of the exposed parts without the attendant difficulties formerly experienced. If it should become necessary to remove the scale from the tank for any reason the oil can be drained by plug 24 and after the cover plate 16 and platform 26 have been removed and screws 20 loosened the scale assembly can be lifted bodily from the tank.

The oil in the tank in no wise affects the weighing except for the slight buoyant effect of the platform holder 15. This can be compensated for by the proper placing of the graduations of chart 12, or by other compensating means, if desirable or necessary. The oil also lubricates the pivots and thereby minimizes friction.

While I have particularly pointed out one use to which my scale is adaptable, namely, dairies and markets, it is also adaptable to uses where water, dust or corrosive materials are encountered. It will also be apparent that the use of the oil within the tank may be dispensed with in some instances. Its use is generally found desirable as it forms a protective medium for the delicate scale parts and at the same time lubricates them.

What I claim is:

1. In a scale, in combination, a scale having the usual operating parts, a protecting tank surrounding said parts and adapted to contain a protecting liquid therefor, a weight moved part extending into the tank into cooperation with the said operating parts and an adjusting device extending to the scale operating parts from a point without the tank.

2. In a scale, in combination, a base structure, a chart and scale operating parts supported thereby, a tank surrounding the base structure and a cover for said tank having an integral chart housing at one end surrounding the chart and a single opening for a weight moved part at the other end thereof.

3. In a scale, in combination, a base structure, a chart housing, a lever system supported by the base structure, a shot cup carried thereby, a platform holder and a platform, an oil tank surrounding the base structure and adapted to contain a substance submerging the base structure lever system and shot cup, said platform holder projecting without the said tank.

4. In a scale, in combination, a chart housing, a base structure, a tank surrounding the base structure, scale operating parts within the tank and supported by the base structure, a platform holder having depending flanges carried by said operating parts and extending without the tank, a platform thereon adapted to receive the goods to be weighed, and a platform holder guard extending to a point within and above the bottom of said flanges and adapted to prevent the ingress of substances to the tank around the platform holder.

5. In a scale, in combination, a scale assembly including a chart and a weight indicator, means for housing said assembly, said means comprising a tank or casing housing the lower parts of the assembly and a cover having at one end a housing for the chart and weight indicator parts of the assembly, a weight moved part extending through a single opening in said cover at the end remote from the chart housing adapted to cooperate with scale parts within the tank, and means for protecting said opening to prevent the ingress of foreign substances into the tank.

6. In a scale, in combination, a scale assembly including a base, operating parts carried thereby, a chart, and a weight indicator, a housing adapted to encase said entire assembly, a weight moved part extending through said housing and carrying a platform for the goods to be weighed and a zero adjusting device cooperating with the operating parts of the scale and having a part extending through the said housing.

7. In a device of the class described, in combination, a scale lever pivoted intermediate its ends and having an indicator and cooperating operating parts connected to one end and a platform holder on its opposite ends, a tank surrounding said lever and containing a protecting liquid, said tank having a chart housing into which the indicator extends at one end and an opening for the platform holder at the opposite end.

8. In a device of the class described, in combination with a tank-like protecting housing, of a scale assembly within said housing and including a lever, an automatic load counterbalancing means and an interconnected indicator, said indicator being adapted to be variably displaced directly in accordance with variable loads applied to the lever, a protecting chart housing projecting upwardly from the tank housing adjacent one end thereof into which the indicator extends, a single platform holder cooperating with the scale lever to apply loads thereto and an opening into the tank housing through which said platform holder extends into cooperation with the lever.

In testimony whereof I hereunto affix my signature.

JOSEPH HOPKINSON.